(No Model.) 2 Sheets—Sheet 1.

W. O. LENTZ.
SEPARATOR.

No. 548,645. Patented Oct. 29, 1895.

WITNESSES:
Edward Thorpe

INVENTOR
W. O. Lentz
BY
Munn & Co
ATTORNEYS.

(No Model.)  W. O. LENTZ.  2 Sheets—Sheet 2.
SEPARATOR.

No. 548,645.  Patented Oct. 29, 1895.

WITNESSES:
Edward Thorpe

INVENTOR
William O. Lentz,
BY
ATTORNEYS.

UNITED STATES PATENT OFFICE.

WILLIAM O. LENTZ, OF MAUCH CHUNK, PENNSYLVANIA.

SEPARATOR.

SPECIFICATION forming part of Letters Patent No. 548,645, dated October 29, 1895.

Application filed January 23, 1895. Serial No. 535,855. (No model.)

*To all whom it may concern:*

Be it known that I, WILLIAM O. LENTZ, of Mauch Chunk, in the county of Carbon and State of Pennsylvania, have invented a new and Improved Separator, of which the following is a full, clear, and exact description.

The invention relates to jigs for separating coal from slate, ore, and other material; and its object is to provide a new and improved separator arranged to readily separate the lighter material from the heavier in a simple and comparatively inexpensive manner.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
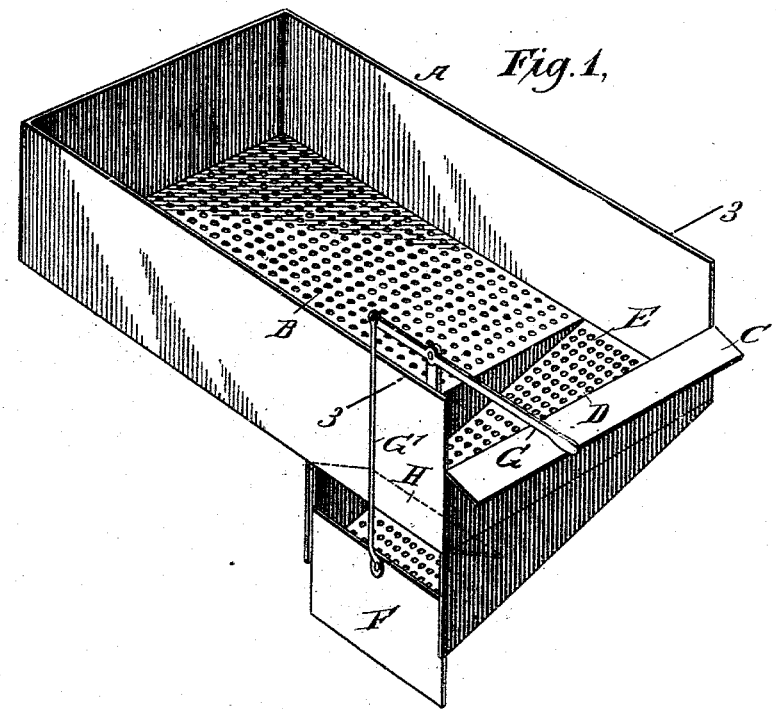
Figure 2:
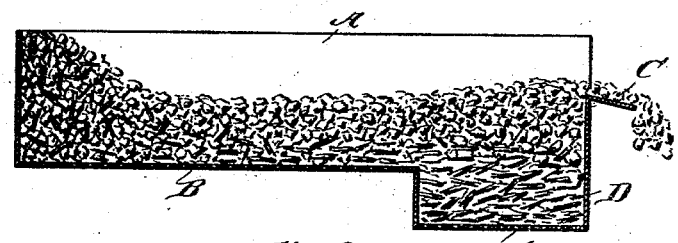
Figure 3:
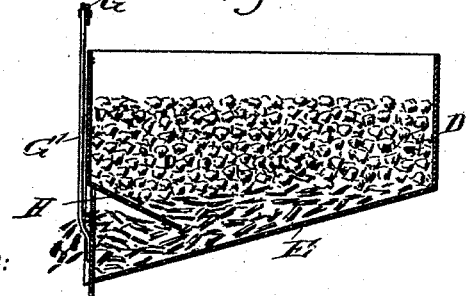
Figure 4:
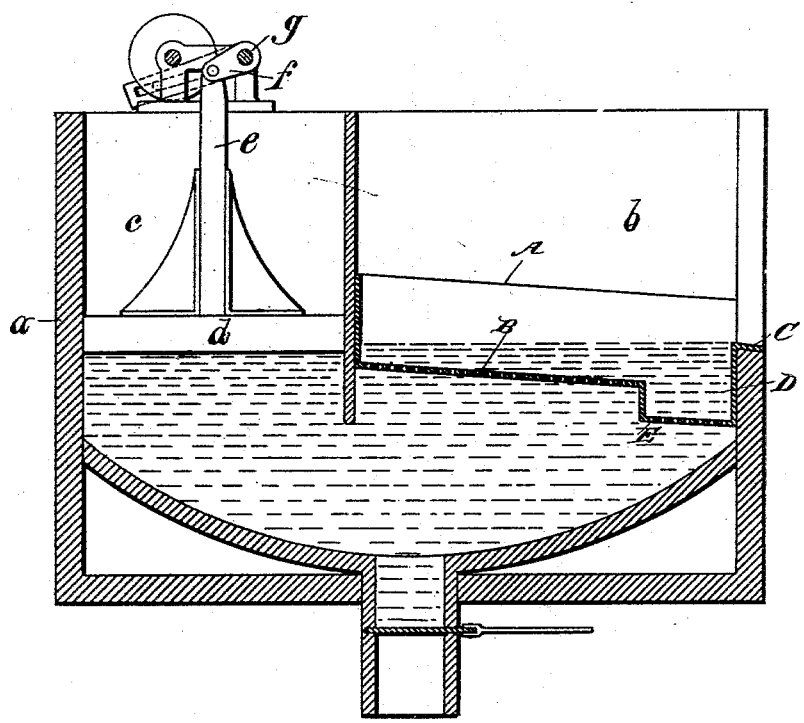

Figure 1 is a perspective view of the improvement. Fig. 2 is a sectional side elevation of the same. Fig. 3 is a transverse section of the same on the line 3 3 of Fig. 1; and Fig. 4 is a sectional view of a jig, showing the improvement applied.

While the improved pan A, having a perforated bottom B, is applicable to a jig in which the pan is moved up and down in a tank of water by an engine or other motor located above the pan, yet it is by preference shown in the drawings applied to a plunger-jig, wherein the pan A is fixed in a compartment $b$ of the tank $a$, and an up-and-down motion is imparted to the water by a plunger $d$ in the compartment $c$ of the tank, and having its rod $e$ connected to the crank $f$ of the shaft $g$, driven by any suitable means. In both cases, however, each pulsation of the water raises the coal and slate slightly and causes the same to separate and work forwardly toward the overflow C at the front of the pan A. The slate, on account of being heavier, is in the lower part of the pan A, while the coal is on top and is discharged over the overflow C.

In the front end of the pan A is arranged a transversely-extending well D, having a perforated inclined bottom E, as is plainly shown in Figs. 1 and 3, and on the lower end of this well D is arranged a gate F, adapted to slide vertically in suitable bearings in the sides of the well, as is plainly illustrated in the drawings. The gate F is connected by a link G' with a lever G, under the control of the operator, to enable the latter to set the gate F at any desired point, it being understood that the upper edge of the gate is a suitable distance below the side of the pan A to form an outlet for the slate. (See Fig. 3.)

Into the well D extends a shield H, commencing from the lower edge of the side of the pan A, to then extend inwardly and downwardly to within a short distance of the inclined perforated bottom E of the well, so that the slate can pass through the passage formed between the inner end of the shield and the bottom E of the well to the lower end of the latter, to then pass over the top edge of the gate F, as indicated in Fig. 3.

Now it will be seen that by the arrangement described the coal and slate are readily separated, the coal passing over the overflow C and the slate passing down the well D to pass over the gate F and then into a separate compartment, to be removed therefrom by elevators or other means. The gate F can be adjusted so as to have a constant discharge of slate to permit an uninterrupted motion in the direction desired.

By adjusting the gate so that its upper edge will be higher than the horizontal plane of the lower edge of the inclined shield H the slate will accumulate in the well to a level above the said lower edge of the shield, as shown in Fig. 3, and the escape of coal under said shield along with the slate prevented.

Having thus fully described my invention, I claim as new and desire to secure by Letters Patent—

1. A separator, comprising a pan provided at one end with an overflow, a well at the overflow end of the pan and provided with an inclined bottom, a gate for the lower end of the well, and a shield secured to the lower edge of the side of the pan and extending inwardly and downwardly into the well, the inner, lower end of the shield terminating a suitable distance above the inclined bottom of the well, substantially as shown and described.

2. In a separator, the combination with a pan having a perforated bottom and provided at one end with an overflow and with a transversely extending well, said well having an inclined and perforated bottom, of a shield secured to one side of the pan and projecting inwardly and downwardly into the well, and a vertically sliding gate at the lower end of the well, said gate being adapted to be lowered or raised to increase or decrease the opening between the top of the gate and the lower edge of the side of the pan, substantially as described.

WILLIAM O. LENTZ.

Witnesses:
WM. S. CORTRIGHT,
LA FAYETTE LENTZ.